(12) United States Patent
Hou

(10) Patent No.: US 9,988,217 B2
(45) Date of Patent: Jun. 5, 2018

(54) CONVEYOR BELT WEAR MONITORING SYSTEM

(71) Applicant: The Yokohama Rubber Co., LTD., Minato-ku, Tokyo (JP)

(72) Inventor: Gang Hou, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days. days.

(21) Appl. No.: 15/525,920

(22) PCT Filed: Aug. 26, 2015

(86) PCT No.: PCT/JP2015/074066
§ 371 (c)(1),
(2) Date: May 10, 2017

(87) PCT Pub. No.: WO2016/075981
PCT Pub. Date: May 19, 2016

(65) Prior Publication Data
US 2017/0313523 A1    Nov. 2, 2017

(30) Foreign Application Priority Data

Nov. 10, 2014    (JP) ................. 2014-227698

(51) Int. Cl.
*B65G 43/00* (2006.01)
*B65G 43/02* (2006.01)

(52) U.S. Cl.
CPC .................. *B65G 43/02* (2013.01)

(58) Field of Classification Search
CPC .............. B65G 43/02; B65G 2203/044; B65G 2203/0275
(Continued)

(56) References Cited

U.S. PATENT DOCUMENTS 6,831,566 B1 * 12/2004 Kusel; Bernd ........ B65G 43/02
198/464.4
7,624,857 B2 * 12/2009 Kusel .................... B65G 43/02
198/502.4
(Continued)

FOREIGN PATENT DOCUMENTS

JP    S57-020606    2/1982
JP    S57-33116     2/1982
(Continued)

OTHER PUBLICATIONS

International Sear Report for International Application No. PCT/JP2015/074066 dated Dec. 1, 2015, 4 pages, Japan.

*Primary Examiner* — James R Bidwell
(74) *Attorney, Agent, or Firm* — Thorpe North & Western

(57) ABSTRACT

Provided is a conveyor belt wear monitoring system capable of determining the wear condition of an upper rubber cover of a conveyor belt. When the conveyor belt is stopped, on the return side of the conveyor belt, a wear detector with a sensor unit corresponding to an upper cover rubber is disposed, the wear detector is controlled by a control unit to move across an entire length in a belt width direction and the distance from the sensor unit and a surface of the upper cover rubber is detected, the detected data is received by a calculation unit, and an amount of wear of the upper cover rubber is calculated on the basis of the received data.

6 Claims, 4 Drawing Sheets

(58) Field of Classification Search
USPC .................................................. 198/810.02
See application file for complete search history.

(56) References Cited

U.S. PATENT DOCUMENTS

| | | | | |
|---|---|---|---|---|
| 8,991,594 B2* | 3/2015 | Nakamura | ............. | B65G 43/02 |
| | | | | 198/810.02 |
| 2009/0145730 A1* | 6/2009 | Aizawa | ................. | B65G 43/02 |
| | | | | 198/810.02 |
| 2009/0266684 A1* | 10/2009 | Nishikita | ............... | B65G 43/02 |
| | | | | 198/810.02 |
| 2016/0327517 A1* | 11/2016 | Sakaguchi | ............. | B65G 43/02 |

FOREIGN PATENT DOCUMENTS

| | | |
|---|---|---|
| JP | H09-012128 | 1/1997 |
| JP | 2007-171016 | 7/2007 |
| JP | 2010-052927 | 3/2010 |
| JP | 2010-260645 | 11/2010 |
| WO | WO 2009/028667 | 3/2009 |

\* cited by examiner

CONVEYOR BELT WEAR MONITORING SYSTEM

TECHNICAL FIELD

The present technology relates to a conveyor belt wear monitoring system, and particularly relates to a conveyor belt monitoring system capable of accurately determining the wear condition of an upper rubber cover.

BACKGROUND ART

Various objects, including mineral resources such as iron ore and limestone, are conveyed by a conveyor belt. When being conveyed by the conveyor belt, the objects to be conveyed are fed onto an upper rubber cover of the conveyor belt from a hopper or another conveyor belt. The fed objects to be conveyed are loaded on the upper rubber cover and conveyed in a traveling direction of the conveyor belt. Here, the upper rubber cover is subject to wear as a result of the objects to be conveyed sliding on the upper rubber cover. When a conveyor belt with reduced tolerance strength due to wear caused by the objects to be conveyed is continuously used, the conveyor belt may sever, forcing the cessation of operations. For repairs, great amounts of time and costs are required. To prevent such problems, technologies for detecting the wear condition of conveyor belts are known (see for example Japanese Unexamined Patent Application Publication No. 2010-52927A).

However, conventional technologies that detect the wear condition while the conveyor belt is running suffer from sensor errors when detecting the amount of wear caused by vibrations of the running conveyor belt. Thus, the wear condition of the upper rubber cover of the conveyor belt is unable to be detected with a sufficient accuracy.

SUMMARY

The present technology provides a conveyor belt wear monitoring system capable of accurately determining the wear condition of an upper rubber cover of a conveyor belt.

An embodiment of the present technology is a conveyor belt wear monitoring system comprising: a wear detector disposed corresponding to an upper cover rubber of a conveyor belt; a control unit that controls movement of the wear detector; a calculation unit that receives detection data from the wear detector; wherein when the conveyor belt is stopped, the wear detector is controlled by the control unit to move across an entire length in a belt width direction and detect an amount of wear of the upper cover rubber.

According to an embodiment of the present technology, the amount of wear is detected when the conveyor belt is stopped. This allows highly accurate detection data to be obtained without errors relating to vibrations of the conveyor belt affecting the wear detector. Additionally, because of this, the wear detector is less likely to break down.

The wear detector may be disposed at a plurality of positions spaced apart from each other in a longitudinal direction of the conveyor belt. Detecting the wear condition of the conveyor belt at a plurality of positions makes it possible to determine an averaged wear condition without outliers. The wear condition of the upper cover rubber affected by the object to be conveyed is mostly the same at any position in the circumferential direction of the conveyor belt due to the same conditions existing at any position in the circumferential direction of the conveyor belt. Accordingly, in embodiments with a plurality of wear detectors, when one of the wear detectors detects an implausible value, it can be assumed that there is a high possibility that the wear detector is faulty. This helps detect faulty wear detectors.

The wear detector may include a rotary roller, and the wear detector may be moved across the entire length in the belt width direction with the rotary roller rolling in contact with the upper cover rubber. By providing the wear detector with a rotary roller, the conveyor belt is made more stable, thus allowing the wear condition to be more accurately determined.

A contact member may be disposed spaced apart in a belt thickness direction from the rotary roller in contact with the upper cover rubber, wherein the rotary roller and the contact member sandwich the conveyor belt with the contact member in contact with a lower cover rubber. This allows sagging and deformation of the conveyor belt to be suppressed more than embodiments without a contact member. Thus, such embodiments are advantageous in detecting the wear condition with high accuracy.

The contact member may be an elongated body that extends the entire length in the belt width direction. Alternatively, the contact member may be a moving roller that moves in sync with the rotary roller. A suitable contact member is preferably selected based on the size of the installation space and the like.

The wear detector preferably moves back and forth at least across the entire length in the belt width direction. Detecting the same position a plurality of times makes it possible to increase the reliability of the detection data.

DETAILED DESCRIPTION

Figure 1:
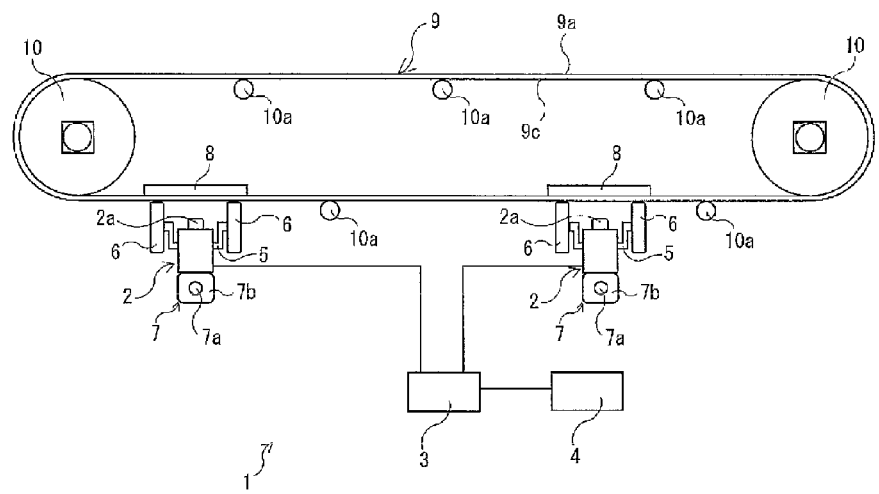
FIG. 1 is an explanatory diagram illustrating a conveyor belt in a side view to which a conveyor belt wear monitoring system of an embodiment of the present technology is applied.

A conveyor belt wear monitoring system of the present technology will be described below based on embodiments illustrated in the drawings.

Figure 2:
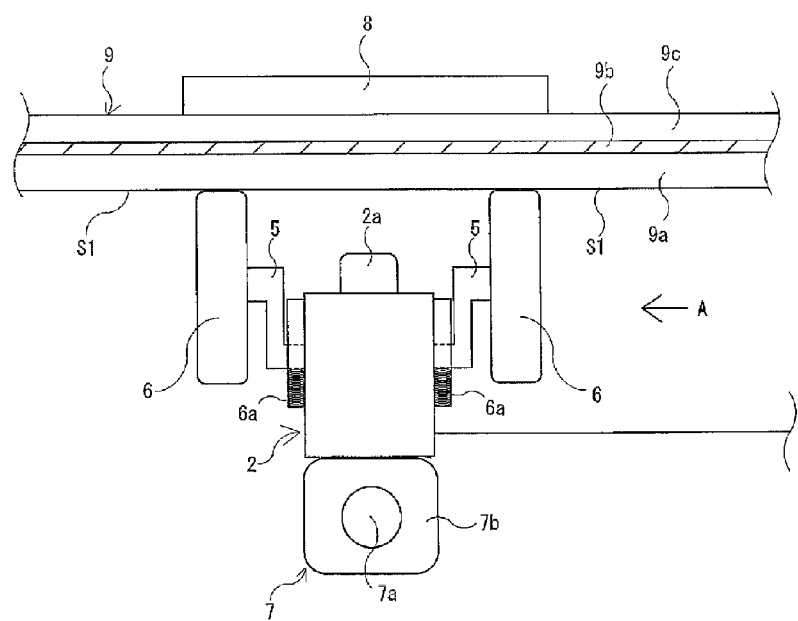
FIG. 2 is an explanatory diagram of the region proximal to the wear detector illustrated in FIG. 1 enlarged.
Figure 3:
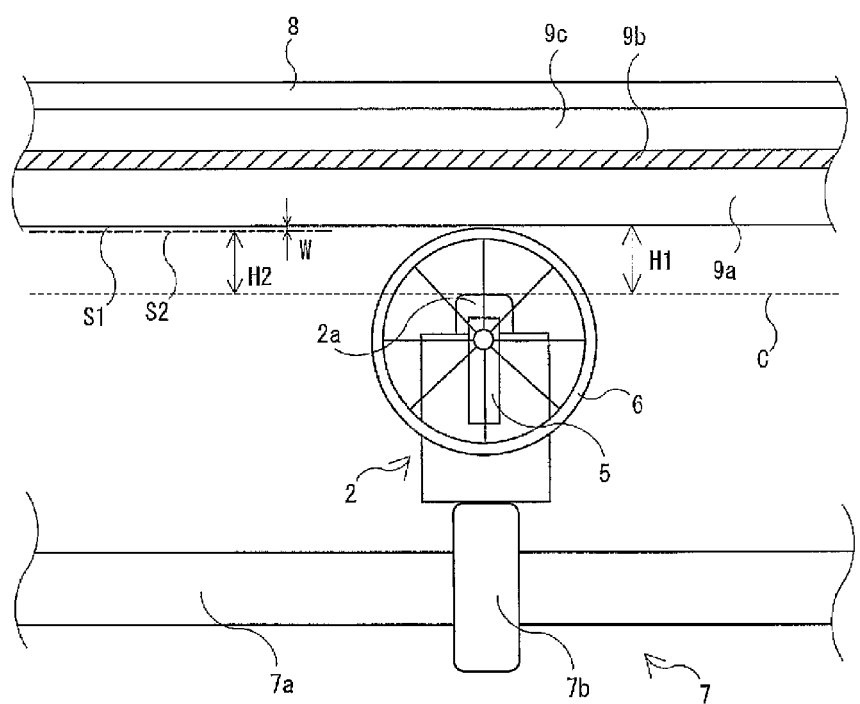
FIG. 3 is a view taken in the direction of the arrow A in FIG. 2.

A conveyor belt wear monitoring system 1 (referred to below as "system 1") of an embodiment of the present technology illustrated in FIGS. 1 to 3 is to be applied to a conveyor belt 9 of a functioning conveyor belt line. In a functioning conveyor belt line, an object to be conveyed conveyed by another conveyor belt is fed onto the conveyor belt 9 and conveyed to a conveying destination by the conveyor belt 9. The object to be conveyed may be fed onto the conveyor belt 9 by a hopper and the like. The conveyor belt 9 is mounted on pulleys 10 at a prescribed tension. Between the pulleys 10, the conveyor belt 9 is supported by support rollers 10a disposed at appropriate intervals in the belt longitudinal direction.

The conveyor belt 9 is constituted by a core layer 9b including a core made of canvas, steel cord, or the like, and an upper cover rubber 9a and a lower cover rubber 9c that sandwich the core layer 9b therebetween. The core layer 9b is a member that bears the tension that causes the conveyor belt 9 to be at tension.

The system 1 includes a wear detector 2 that detects the amount of wear of the upper cover rubber 9a, a control unit 3 that controls the movement of the wear detector 2, and a calculation unit 4 that receives the detection data from the wear detector 2. In this embodiment, the wear detector 2 includes a sensor unit 2a, and two wear detectors 2 are installed on the return side of the conveyor belt 9 at intervals in the longitudinal direction. The carrying side of the conveyor belt 9 is trough-like, which is why the wear detector 2 is installed on the flat return side. However, the wear detector 2 can be installed at a portion on the carrying side which is flat across the entire belt width if there is such a portion.

Also in this embodiment, the control unit 3 and the calculation unit 4 are independent of each other. However, the control unit 3 and the calculation unit 4 can be integrated. The wear detector 2 is connected with the control unit 3 and the calculation unit 4 via a wired or wireless connection.

The sensor unit 2a that constitutes a part of the wear detector 2 measures the distance H1 to a surface (conveying surface) S1 of the upper cover rubber 9a, for example. Examples of the sensor unit 2a include a laser sensor and an ultrasonic sensor. A sensor unit 2a that measures the surface condition of the upper cover rubber 9a in three dimensions can be used instead of the sensor unit 2a that measures linear distance to obtain more detailed data on the amount of wear.

A rotary roller 6 that rolls in the belt width direction is connected to either sides of the wear detector 2 through a support shaft 5. The rotary roller 6 and the support shaft 5 is moveable in the belt thickness direction relative to the wear detector 2 via suspension 6a. Additionally, a guide ring 7b is connected to the lower end portion of the wear detector 2. A guide rod 7a that extends in the belt width direction is inserted in the guide ring 7b. The guide rod 7a and the guide ring 7b constitute a guide 7 that guides the movement in the belt width direction of the wear detector 2.

A contact member 8 is disposed spaced apart in the belt thickness direction from the rotary roller 6 in contact with the upper cover rubber 9a. The contact member 8 is in contact with the lower cover rubber 9c and sandwiches the conveyor belt 9 with the rotary roller 6. In this embodiment, an elongated body that extends across the entire length in the belt width direction is used as the contact member 8. The contact member 8 is made to stand by at a position that does not interfere with the running of the conveyor belt 9. When the amount of wear of the upper cover rubber 9a is measured, the contact member 8 is placed at a preset position that is a constant position in the vertical direction (position in the belt thickness direction).

Next, the method of detecting the amount of wear of the upper cover rubber 9a of the conveyor belt 9 employed by the system 1 is described.

In embodiments of the present technology, an amount of wear W of the upper cover rubber 9a of the conveyor belt 9 is detected while the conveyor belt 9 is not running. The conveyor belt 9 may be stopped routinely or when maintenance and the like is necessary. The amount of wear W is detected during such periods. For example, the amount of wear W is detected every day at night when the conveyor belt 9 is stopped.

In installing the wear detector 2 on the conveyor belt 9, from the standby position, the contact member 8 is brought into contact with the lower cover rubber 9c at a preset position in the belt circumferential direction with the position in the vertical direction (position in the belt thickness direction) remaining constant. Then, the wear detector 2 is installed corresponding to the contact member 8 to sandwich the conveyor belt 9. Here, the rotary roller 6 is brought into contact with the upper cover rubber 9a, and the biasing force of the suspension 6a is adjusted to a strength that does not deform the upper cover rubber 9a. In such a manner, the rotary roller 6 and the contact member 8 sandwich the conveyor belt 9.

Next, detection of the amount of wear W of the upper cover rubber 9a is initiated. The control unit 3 controls the wear detector 2 to detect the distance H1 from the sensor unit 2a to the surface of the upper cover rubber 9a while the wear detector 2 moves across the entire length in the belt width direction guided by the guide ring 7b and the guide rod 7a. Here, the rotary roller 6 rolls in contact with the upper cover rubber 9a. Once the wear detector 2 moves across the entire length of the belt width, the detection of the distance H1 is terminated. The detection data (the distance H1) from the sensor unit 2a is received by the calculation unit 4.

The mechanism that moves the wear detector 2 in the belt width direction is not particularly limited and various mechanisms can be employed. For example, the guide rod 7a and the guide ring 7b may screw together, and the guide rod 7a rotates about the axis thereof to move the guide ring 7b in the longitudinal direction of the guide rod 7a (belt width direction). Alternatively, the wear detector 2 may be moved in the belt width direction by pulling a wire or the like connected to the wear detector 2.

Next, a method of obtaining the amount of wear W is described based on FIG. 3. Reference sign S1 denotes the position of the surface of the upper cover rubber 9a that is the current detection target. Reference sign S2 denotes an imaginary line that represents the position of the surface of the upper cover rubber 9a that is the previous detection target. The vertical position of the upper end of the sensor unit 2a is defined as reference line C. The reference line C has the same vertical position as the previous detection and remains constant. The contact member 8 also has the same vertical position as the previous detection and remains constant.

A distance H2 of the previous detection from the sensor unit 2a to the surface of the upper cover rubber 9a is stored in the calculation unit 4. By subtracting the distance H2 from the currently detected distance H1, the amount of wear W of the upper cover rubber 9a in the period between the previous detection and the current detection can be obtained. Specifically, amount of wear W=H1−H2. Note that in FIG. 3, H1, H2, and the amount of wear W are illustrated exaggerated in size. Thereafter, the amount of wear W in a desired period can be obtained via a similar process by detecting the distance from the sensor unit 2a to the surface of the upper cover rubber 9a in a similar manner.

According to embodiments of the present technology described above, the amount of wear W of the upper cover rubber 9a is detected when the conveyor belt 9 is stopped, allowing highly accurate detection data to be obtained without errors relating to detection by the wear detector 2 caused by vibrations of the conveyor belt 9 and the like. The amount of wear W in the belt width direction can be obtained, and this means that a distribution of the amount of wear W in the belt width direction can be determined.

Additionally, the wear detector 2 is not subject to vibrations from the running conveyor belt 9, thus greatly reducing the risk of it breaking down. This is a great advantage for embodiments in which a precise wear detector 2 is used.

The wear detector 2 preferably moves back and forth at least across the entire length in the belt width direction. If the wear detector 2 detects the distance H1 (H2) at the same position a plurality of times, the reliability of the detection data can be increased. In such embodiments, the average value of the detection data may be used, for example.

In some embodiments, the rotary roller 6 may not be provided. However, by providing the rotary roller 6, sagging and deformation of the conveyor belt 9 can be suppressed, and thus detection can be carried out with the conveyor belt 9 in a stable state. This is advantageous in obtaining highly accurate detection data. Providing the contact member 8 can also suppress sagging and deformation of the conveyor belt 9, thus further contributing to obtaining highly accurate detection data.

The number of installed wear detectors 2 may be one. However, by installing a plurality of wear detectors 2 to detect the amount of wear W as in this embodiment, an averaged wear condition of the conveyor belt 9 without outliers can be determined. The number of the wear detector 2 is not limited to any particular number, and may range from 2 to 4 for example.

The wear condition of the upper cover rubber 9a affected by the object to be conveyed is mostly the same at any position in the circumferential direction of the conveyor belt 9 due to the same conditions existing at any position in the circumferential direction of the conveyor belt 9. Accordingly, in embodiments with a plurality of wear detectors 2, when one of the wear detectors 2 detects an implausible value, it can be assumed that there is a high possibility that the wear detector 2 is faulty. Thus, installing a plurality of wear detectors 2 is advantageous in discovering faulty wear detectors 2. Installing three or greater wear detectors 2 further facilitates the discovery of faulty wear detectors 2.

Figure 4:
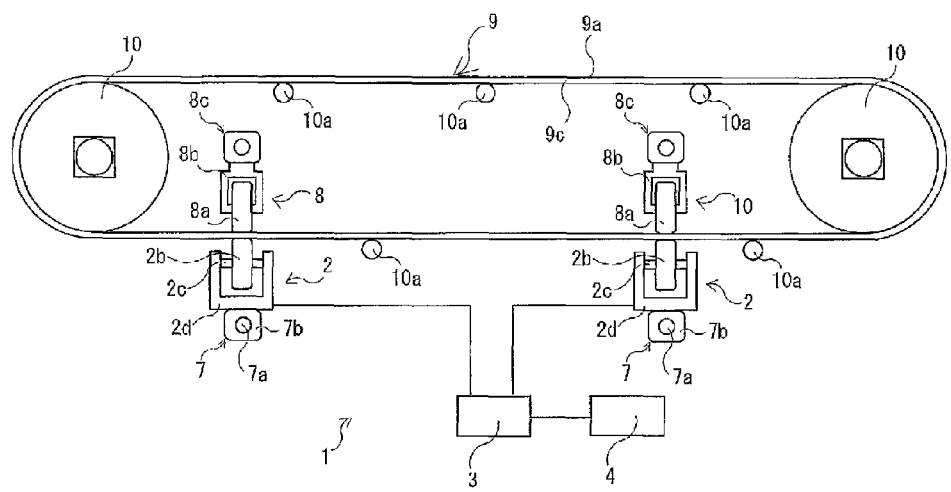
FIG. 4 is an explanatory diagram illustrating a conveyor belt in a side view to which a conveyor belt wear monitoring system of another embodiment of the present technology is applied.
Figure 5:
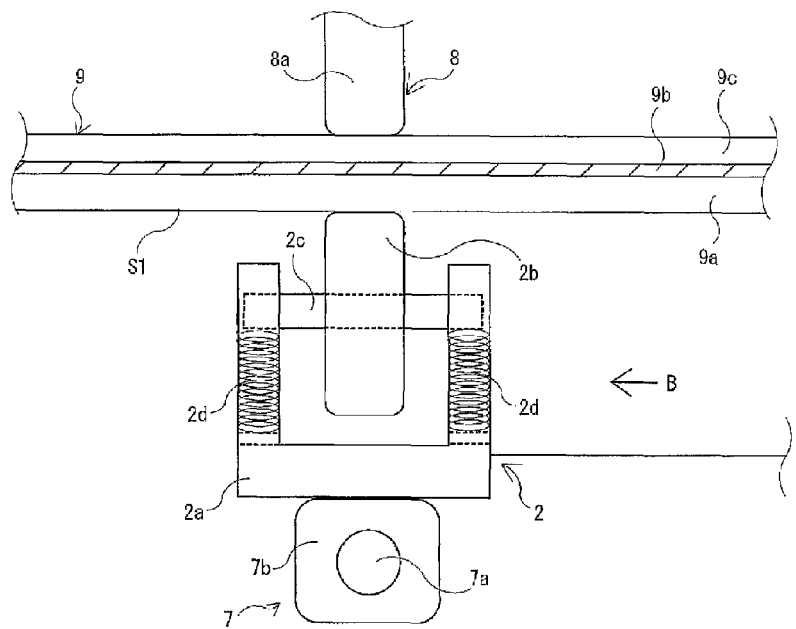
FIG. 5 is an explanatory diagram of the region proximal to the wear detector illustrated in FIG. 4 enlarged.
Figure 6:
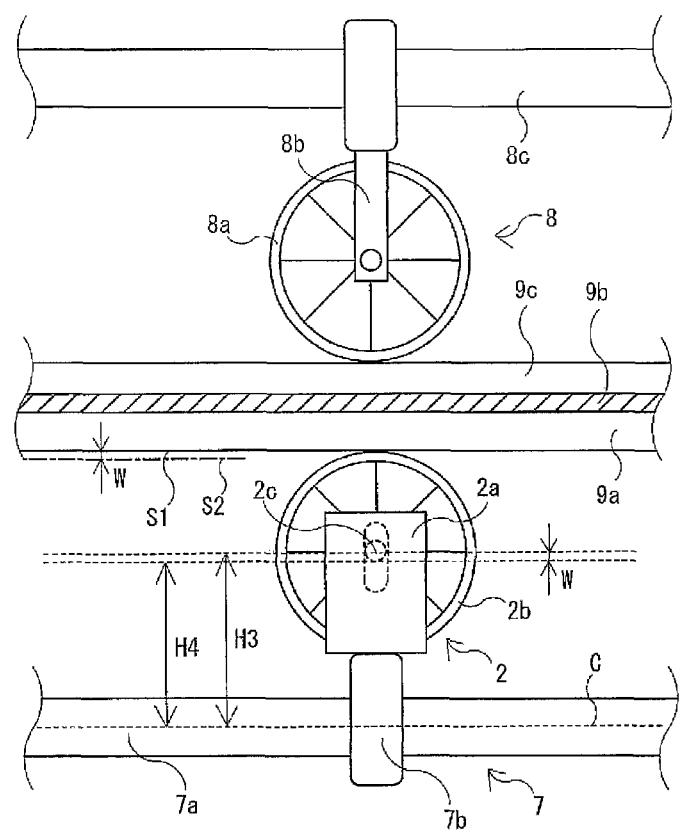
FIG. 6 is a view taken in the direction of the arrow B in FIG. 5.

A system 1 according another embodiment of the present technology is illustrated in FIGS. 4 to 6. This embodiment has the same configuration as the previous embodiment except that the wear detector 2 and the contact member 8 are different.

The wear detector 2 of this embodiment includes a sensor unit 2a and a sensor roller 2b. The sensor roller 2b is supported by a support shaft 2c to be rotatable about the sensor unit 2a. The support shaft 2c is moveable in the belt thickness direction via a suspension 2d incorporated in the sensor unit 2a. A guide ring 7b into which a guide rod 7a is inserted is connected to the lower end portion of the wear detector 2 in a similar manner to that of the previous embodiment. When the amount of wear W is detected, the guide rod 7a is installed at a preset position that is a constant position in the vertical direction. The sensor unit 2a detects, for example, a distance H3 from the center of the support shaft 2c to the center of the guide rod 7a.

The contact member 8 includes a moving roller 8a. The moving roller 8a is supported by a support frame 8b in a manner allowing for rotation. The support frame 8b and the moving roller 8a move along a guide rod 8c that extends in the belt width direction. The contact member 8 is made to stand by at a position that does not interfere with the running of the conveyor belt 9. When the amount of wear of the upper cover rubber 9a is measured, the contact member 8 is placed at a preset position that is a constant position in the vertical direction (position in the belt thickness direction).

Next, the method of detecting the amount of wear of the upper cover rubber 9a of the conveyor belt 9 employed by the system 1 is described.

In installing the wear detector 2 on the stopped conveyor belt 9, the contact member 8 is moved from the standby position and the moving roller 8a is brought into contact with the lower cover rubber 9c at a preset position in the belt circumferential direction with the position in the vertical direction (position in the belt thickness direction) remaining constant. Then, the wear detector 2 is installed corresponding to the contact member 8 to sandwich the conveyor belt 9. Here, the sensor roller 2b is brought into contact with the upper cover rubber 9a, and the biasing force of the suspension 2d is adjusted to a strength that does not deform the upper cover rubber 9a. In such a manner, the sensor roller 2b and the moving roller 8a sandwich the conveyor belt 9.

Next, detection of the amount of wear W of the upper cover rubber 9a is initiated. The control unit 3 controls the wear detector 2 so the sensor unit 2a detects the distance H3 from the center of the support shaft 2c to the center of the guide rod 7a while the wear detector 2 moves across the entire length in the belt width direction guided by the guide ring 7b and the guide rod 7a. Here, the sensor roller 2b rolls in contact with the upper cover rubber 9a while moving up and down conforming to the surface shape of the upper cover rubber 9a. Accordingly, the support shaft 2c also moves up and down conforming to the surface shape of the upper cover rubber 9a. The moving roller 8a rolls in contact with the lower cover rubber 9c at a position corresponding to the sensor roller 2b while moving in the belt width direction.

Once the wear detector 2 moves across the entire length of the belt width, the detection of the distance H3 is terminated. The detection data (the distance H3) from the sensor unit 2a is received by the calculation unit 4.

The mechanism that moves the wear detector 2 and the moving roller 8a (contact member 8) in the belt width direction is not particularly limited and various mechanisms can be employed such as that described for the previous embodiment.

Next, a method of obtaining the amount of wear W is described based on FIG. 6. Reference sign S1 denotes the position of the surface of the upper cover rubber 9a that is the current detection target. Reference sign S2 denotes an imaginary line that represents the position of the surface of the upper cover rubber 9a that is the previous detection target. The vertical position of the center of the guide rod 7a is defined as reference line C. The reference line C has the same vertical position as the previous detection and remains constant. The moving roller 8a (the contact member 8) also has the same vertical position as the previous detection and remains constant.

A distance H4 of the previous detection by the sensor unit 2a from the center of the support shaft 2c to the reference line C is stored in the calculation unit 4. By subtracting the distance H4 from the currently detected distance H3, the amount of wear W of the upper cover rubber 9a in the period between the previous detection and the current detection can be obtained. Specifically, amount of wear $W=H3-H4$. Note that in FIG. 6, H3, H4, and the amount of wear W are illustrated exaggerated in size. Thereafter, the amount of wear W in a desired period can be obtained via a similar process by detecting the distance from the center of the support shaft 2c to the center of the guide rod 7a in a similar manner.

According to this embodiment, the same effects as the first embodiment can be achieved. In this embodiment, the conveyor belt 9 is sandwiched between the sensor roller 2*b* and the moving roller 8*a*, suppressing sagging and deformation of the conveyor belt 9. As a result, the amount of wear W of the upper cover rubber 9*a* can be detected with high accuracy.

Note that the elongated contact member 8 described in the previous embodiment can also be employed in this embodiment. Additionally, the contact member 8 including the moving roller 8*a* described in this embodiment can be employed in the previous embodiment.

In this embodiment, a sensor can be provided which measures the repulsion force on the sensor roller 2*b* in contact with the upper cover rubber 9*a*. Such a configuration allows the state of deterioration of the upper cover rubber 9*a* to be determined on the basis of the measured repulsion force.

The invention claimed is:

1. A conveyor belt wear monitoring system comprising:
a wear detector disposed corresponding to an upper cover rubber of a conveyor belt, the wear detector including a rotary roller;
a control unit that controls movement of the wear detector; and
a calculation unit that receives detection data from the wear detector; wherein
when the conveyor belt is stopped, the wear detector is controlled by the control unit to move across an entire length in a belt width direction with the rotary roller rolling in contact with the upper cover rubber and detect an amount of wear of the upper cover rubber.

2. The conveyor belt wear monitoring system according to claim 1, wherein the wear detector is disposed at a plurality positions spaced apart from each other in a longitudinal direction of the conveyor belt.

3. The conveyor belt wear monitoring system according to claim 1, further comprising a contact member disposed spaced apart in a belt thickness direction from the rotary roller in contact with the upper cover rubber, wherein the rotary roller and the contact member sandwich the conveyor belt with the contact member in contact with a lower cover rubber.

4. The conveyor belt wear monitoring system according to claim 3, wherein the contact member is an elongated body that extends the entire length in the belt width direction.

5. The conveyor belt wear monitoring system according to claim 3, wherein the contact member is a moving roller that moves in sync with the rotary roller.

6. The conveyor belt wear monitoring system according to claim 1, wherein the wear detector is moved back and forth at least across the entire length in the belt width direction.

* * * * *